(12) United States Patent
Chou

(10) Patent No.: US 6,554,442 B2
(45) Date of Patent: Apr. 29, 2003

(54) KEYBOARD ILLUMINATION STRUCTURE

(75) Inventor: Chin-Wen Chou, Taipei (TW)

(73) Assignee: Shin Jiuh Corp. (TW)

( * ) Notice: Subject to any disclaimer, the term of this patent is extended or adjusted under 35 U.S.C. 154(b) by 0 days.

(21) Appl. No.: 09/888,490

(22) Filed: Jun. 26, 2001

(65) Prior Publication Data

US 2002/0196619 A1 Dec. 26, 2002

(51) Int. Cl.[7] .............................................. F21V 33/00
(52) U.S. Cl. ............................. 362/85; 362/30; 362/84; 200/314; 200/317
(58) Field of Search ............................. 362/84, 85, 30, 362/26, 253; 200/314, 317, 313; 345/170

(56) References Cited

U.S. PATENT DOCUMENTS 6,217,183 B1 * 4/2001 Shipman ..................... 200/314
6,270,229 B1 * 8/2001 Chien .......................... 362/84

* cited by examiner

Primary Examiner—Sandra O'Shea
Assistant Examiner—John Anthony Ward
(74) Attorney, Agent, or Firm—Bacon & Thomas, PLLC

(57) ABSTRACT

A keyboard illumination structure. The structure includes a base board, a circuit board, an elastic member, a bridge mechanism, a key cap and a centralized lighting element located in the keyboard. The lighting element may generate light to pass through the keyboard for indicating the positions of the button keys, vital keys or function keys so that users may locate the required keys rapidly.

15 Claims, 4 Drawing Sheets

KEYBOARD ILLUMINATION STRUCTURE

BACKGROUND OF THE INVENTION

The present invention relates to an improved keyboard illumination structure and particularly a keyboard having a centralized lighting element for illuminating the button key positions or the positions of vital keys or function keys to enable users locating the required keys rapidly.

User-friendliness has long been an important factor in the design and construction of keyboards. These days, many keyboards have evolved from wired and limited range operations to wireless and remote operations. In addition, with increasing enhancements of the computer technology, besides the basic processing logic, the main trend is to combine with household appliances. This is especially true in the innovation of coupling the basic illumination switches. Whereas the keyboards now available on the market mostly do not have illumination design. When users want to use a keyboard to control the lighting switches in the houses, they often have difficulty to know the exact location of the keyboard or where are the right button keys to press. Users often have to fumble in darkness to turn on one of the lighting switches in the house before proceeding the wireless keyboard operation. It is a not a logical way, and indicates the deficiency of the function and design of the wireless keyboards. It hinders the promotion of the wireless keyboards.

Some producers in the industry have made some improvements to overcome this problem. For instance, there are button keys made of transparent material and have light emitting diodes directly mounted to the circuit boards. When the button keys are activated, the light emitting diodes will be energized and generate light to project the button keys to help users to locate the whereabouts of the button keys. However to mount the light emitting diodes to the circuit boards has the following disadvantages:

1. The light emitting diodes and the wireless keyboard use same power supply and are controlled by the same switch. When the light emitting diodes are activated, the wireless keyboard is also at a power on state. Moreover, when users try to use the wireless keyboards in day time or when the rooms are well lit, turning on of the light emitting diodes will greatly reduce power supply duration for the wireless keyboard. As a result, the batteries of the wireless keyboards tend to drain off rapidly and have to replace and replenish frequently. It incurs a lot of inconvenience to users.
2. Directly mounting the light emitting diodes to the circuit boards disrupts the already complex circuitry of the button keys commands. It will increase production costs and result in dropping of production yields. The high loading of the circuit boards makes light emitting diodes damaging easily or tends to cause malfunction of the button key commands. Once damaged or breaking down, they are not replaceable and will incur extra costs to users and cause a lot of troubles.
3. It is difficult for the producers to provide the required numbers of the light emitting diodes or change the configurations thereof to meet the ever changing market requirements. The adaptable keyboards are also limited.

SUMMARY OF THE INVENTION

The primary object of the present invention is to resolve the foregoing disadvantages. In the present invention, a centralized lighting element is provided in the keyboard layer for emitting light to pass through the keyboard. The locations of the button keys, or vital keys or function keys thus will be illuminated and clearly shown. Users may rapidly locate the required button keys.

Another object of the present invention is to provide the lighting element made of a cold light board or cold cathode board with same or different colors.

A further object of the present invention is to have the key caps formed with a light passing aperture, or be made transparent or translucent so that light emitted from the lighting element will pass through the key caps to indicate the vital keys or function keys, and to enable users to locate the required button keys easily and rapidly.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
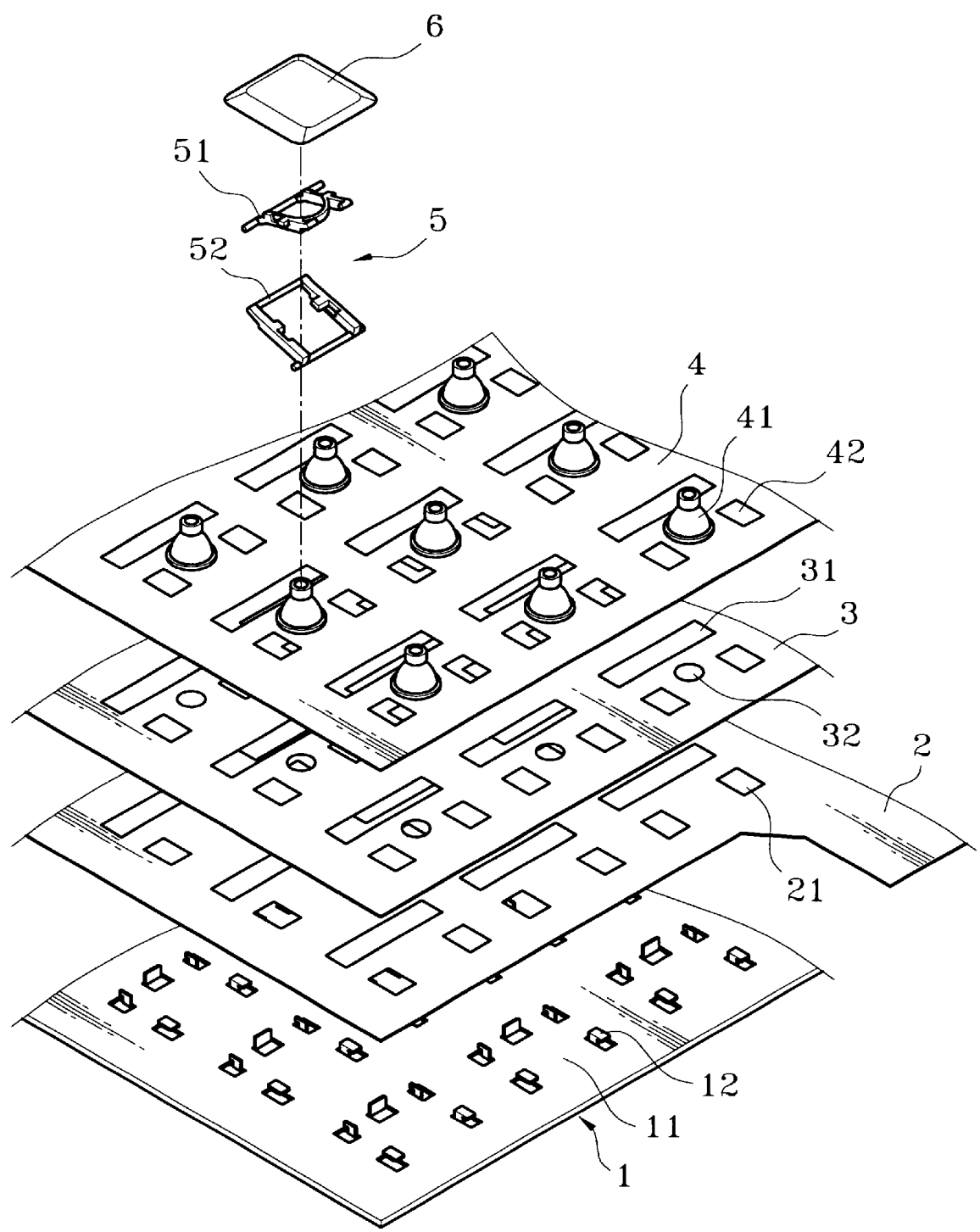
FIG. 1 is a schematic exploded view of a first embodiment of the present invention.
Figure 2:
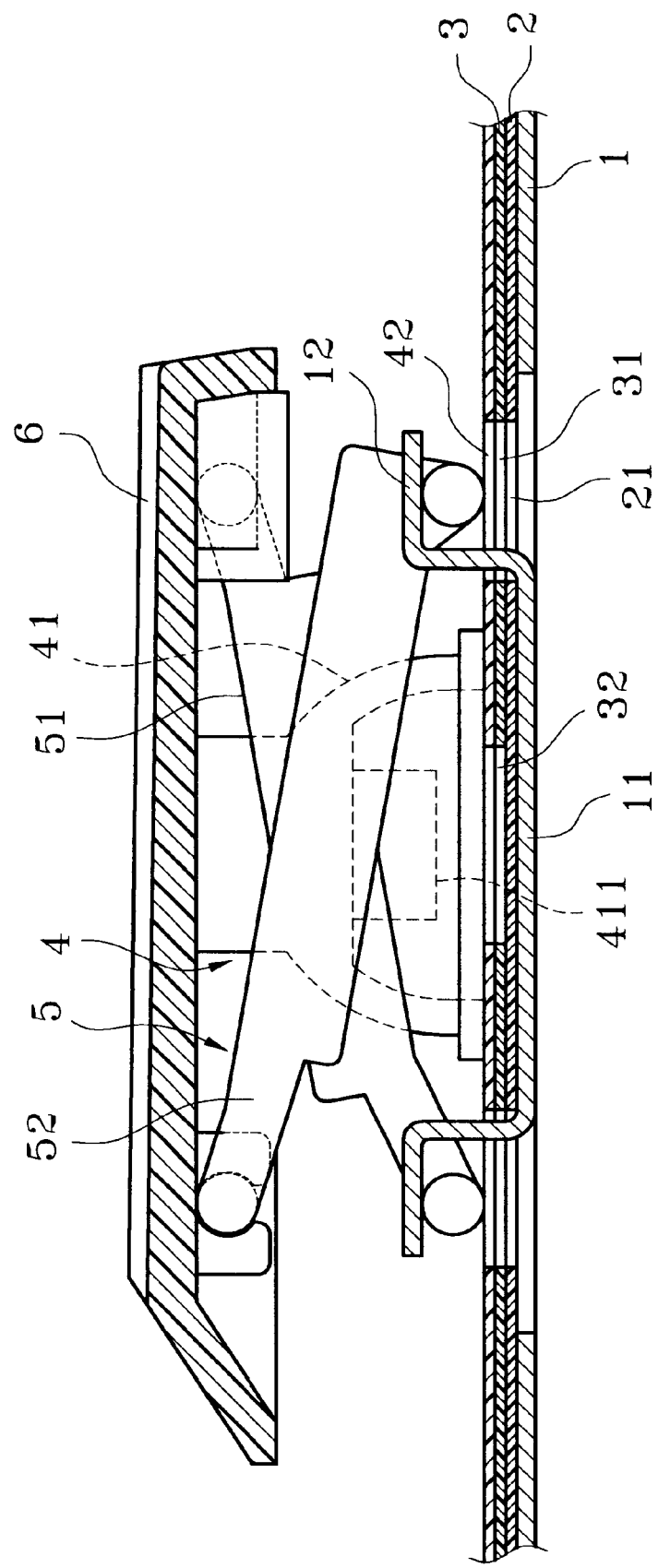
FIG. 2 is a schematic sectional view according to FIG. 1.

Referring to FIGS. 1 and 2 for a first embodiment of the present invention, the keyboard consists of a base board 1, a circuit board 2, a lighting element 3, an elastic member 4, a bridge mechanism 5 and a key cap member 6. The lighting element 3 is located in the keyboard and serves as a centralized lighting source to emit light to pass through the keyboard for indicating the locations of the button keys, vital keys or function keys to enable users to locate the required keys rapidly.

The base board 1 has a plurality of anchor zones 11 which have a plurality of anchor sections 12 located thereon. Each of the anchor sections 12 is for mounting the bridge mechanism 5.

The circuit board 2 is a transparent or translucent membrane circuit board which has signal transmission circuits (not shown in the drawings) located thereon. There are a plurality of openings 21 of same or different shapes mating with the anchor sections 12.

The lighting element 3 is a plate type cold light board or cold cathode board and has a plurality of openings 31 and 32 of same or different shapes mating with the anchor sections 12.

The elastic member 4 has a plurality of elastic sections 41 mating with the openings 32 and conduction points (not shown in the drawings) of the circuit board 2. Around each of the elastic sections 41, there are a plurality of openings 42 of same or different shapes.

The bridge mechanism 5 includes two pivotally crossed levers 51 and 52, and forms a hollow section in the center thereof. The hollow section is straddled above the elastic section 41. The levers 51 and 52 have one end fixed or pivotally engaged to the anchor section 12, and another end pivotally engaged with a key cap 6.

When the key cap 6 is pressed by an external force, the bridge mechanism 5 will be pressed downwards. The elastic section 41 will be deformed under the pressure. The elastic section 41 has a protrusive stub 411 running through the opening 32 of the lighting element 3 and pressing the conduction point of the circuit board 2. The signals of the pressing button keys will transmit through the circuit board 2 to outside. During keyboard operation, the lighting element 3 is at a lighting state. The light emitted by the lighting element 3 projects through the openings 21, 31, 32 and 42 to illuminate the locations of the button keys. Hence users may operate the keyboard without trouble even under a not sufficient room light environment.

The key cap 6 may have an aperture formed thereon to allow light to pass through. Another alternative is to have the key cap 6 made of transparent or translucent material so that light emitting from the lighting element 3 may pass through. Such a design may be used to indicate the vital keys or function keys to enable users to locate rapidly.

The lighting element 3 may also be made with lighting of different colors so that different button key clusters may be shown by light of different colors, or to allow the keyboard illuminating in multiple layers.

Figure 3:
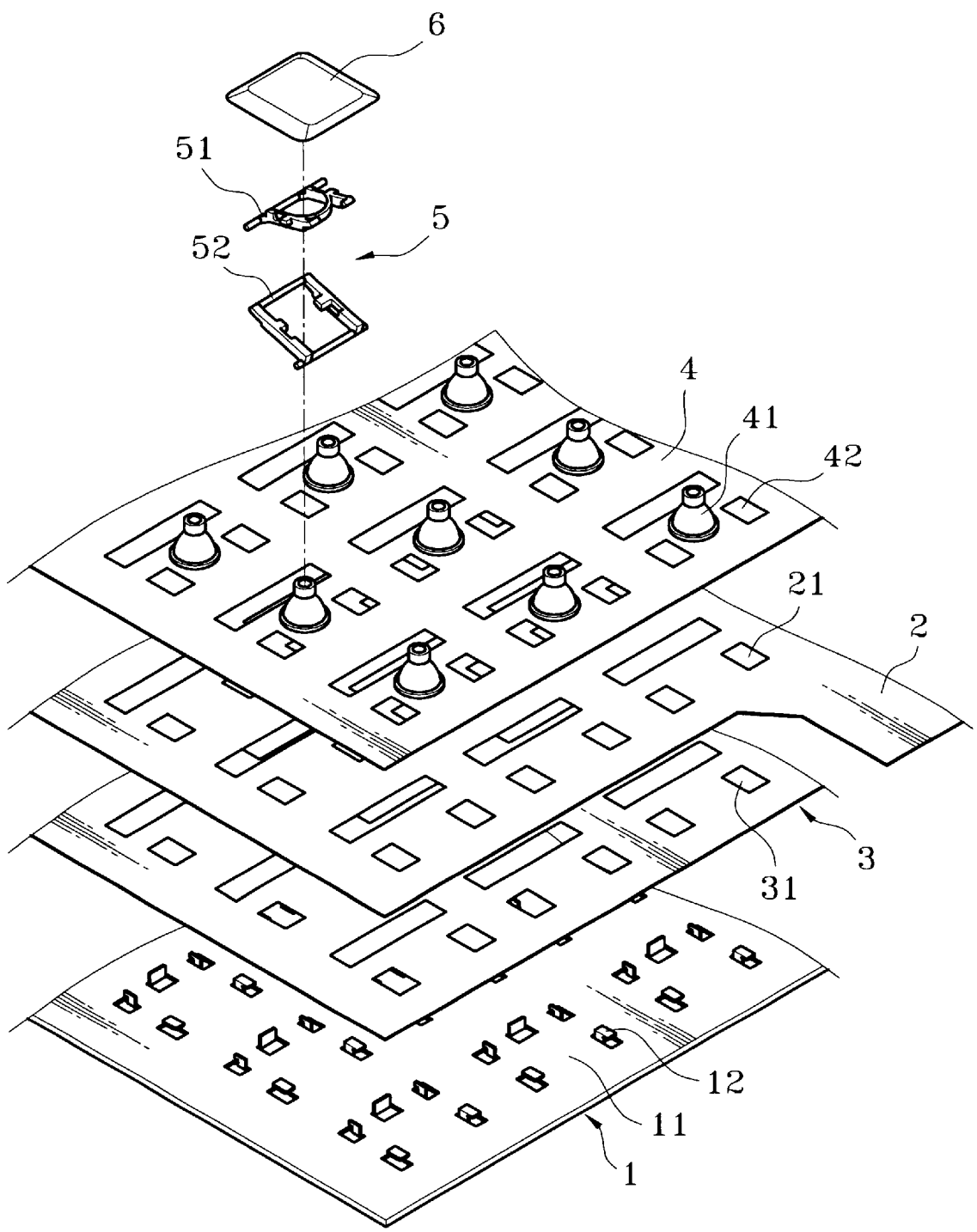
FIG. 3 is a schematic exploded view of a second embodiment of the present invention.

Referring to FIG. 3 for a second embodiment of the present invention, the lighting element 3 is made on the base board 1 and the openings 32 of the lighting element 3 may be dispensed with. The lighting element 3 has sufficient light intensity to project upward to increase the illumination of the keyboard. Such a structure is simpler in manufacturing and may save production processes and time, and also can reduce the production costs.

Figure 4:
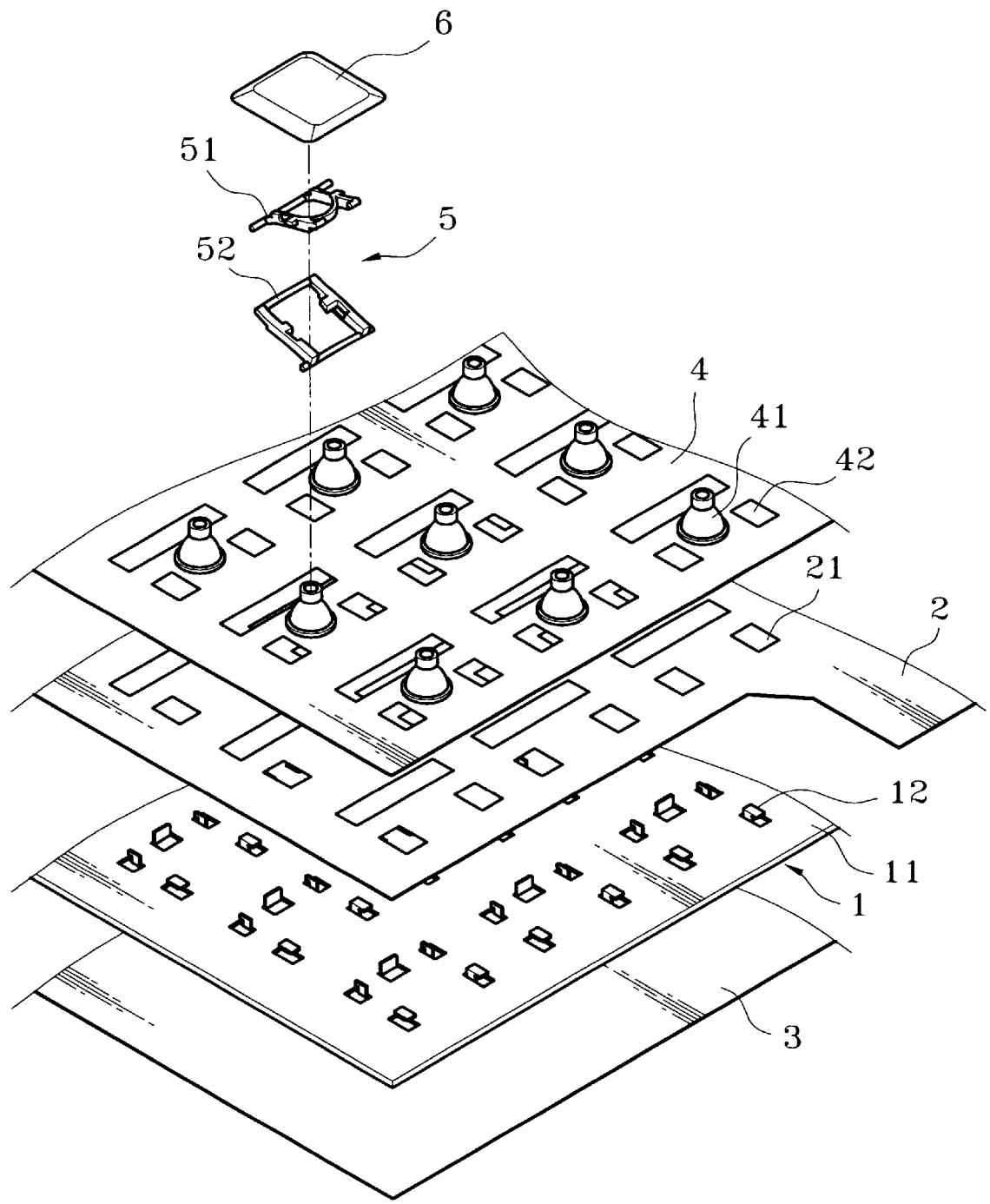
FIG. 4 is a schematic exploded view of a third embodiment of the present invention.

Referring to FIG. 4 for a third embodiment of the present invention, the lighting element 3 is located beneath the base board 1, and the openings 31 and 32 of the lighting element 3 may be dispensed with. The lighting element 3 has sufficient light intensity to project upward to increase the illumination of the keyboard. Such a structure is even simpler in manufacturing and may save more production processes and time, and also can greatly reduce the production costs.

Furthermore, besides employing the lighting element 3 in the keyboards, this invention may also be adapted for use in the keyboards (large size keyboards) for notebook computers, handheld computers or personal computers, or keypads.

What is claimed is:

1. An improved keyboard illumination structure comprising:
  a base board, a circuit board, an elastic member, a bridge mechanism, and a key cap housed in a keyboard, and a centralized lighting element located in the keyboard;
  wherein when the key cap subjects to an external pressing force, the bridge mechanism will be pressed downwards to compress and deform the elastic member which in turn presses the circuit board to transmit a signal, the lighting element generating light to pass through the keyboard for indicating positions of button keys, vital keys or function keys located on the keyboard adapted for users to locate required ones of the keys rapidly; and
  wherein the lighting element is selectively a cold light board or a cold cathode board made in a plate form.

2. The improved keyboard illumination structure of claim 1, wherein the lighting element is located between the circuit board and the elastic member.

3. The improved keyboard illumination structure of claim 1, wherein the lighting element is located on the base board.

4. The improved keyboard illumination structure of claim 1, wherein the lighting element is located beneath the base board.

5. The improved keyboard illumination structure of claim 1, wherein the key cap has an aperture for light emitted by the lighting element to pass through to indicate the positions of the vital keys or the function keys for users to locate the required keys rapidly.

6. The improved keyboard illumination structure of claim 1, wherein the key cap is transparent or translucent.

7. The improved keyboard illumination structure of claim 1, wherein the lighting element is selectively used in keyboards (large size keyboards) of notebook computers, handheld computers or personal computers, or keypads.

8. An improved keyboard illumination structure comprising:
  a base board, a circuit board, an elastic member, a bridge mechanism, and a key cap housed in a keyboard, and a centralized lighting element located in the keyboard;
  wherein when the key cap subjects to an external pressing force, the bridge mechanism will be pressed downwards to compress and deform the elastic member which in turn presses the circuit board to transmit a signal, the lighting element generating light to pass through the keyboard for indicating positions of button keys, vital keys or function keys located on the keyboard adapted for users to locate required ones of the keys rapidly; and
  wherein the lighting element is selectively a plurality of cold light boards or cold cathode boards which have same or different colors.

9. The improved keyboard illumination structure of claim 8, wherein the lighting element is located between the circuit board and the elastic member.

10. The improved keyboard illumination structure of claim 8, wherein the lighting element is located on the base board.

11. The improved keyboard illumination structure of claim 8, wherein the lighting element is located beneath the base board.

12. The improved keyboard illumination structure of claim 8, wherein the lighting element is selectively a cold light board or a cold cathode board made in a plate form.

13. The improved keyboard illumination structure of claim 8, wherein the key cap has an aperture for light emitted by the lighting element to pass through to indicate the positions of the vital keys or the function keys for users to locate the required keys rapidly.

14. The improved keyboard illumination structure of claim 8, wherein the key cap is transparent or translucent.

15. The improved keyboard illumination structure of claim 8, wherein the lighting element is selectively used in keyboards of notebook computers, handheld computers or personal computers, or keypads.

* * * * *